(12) United States Patent
Care et al.

(10) Patent No.: US 7,163,086 B2
(45) Date of Patent: Jan. 16, 2007

(54) LUBRICATION SYSTEM

(75) Inventors: Ian C D Care, Derby (GB); James E Forfar, Nottingham (GB)

(73) Assignee: Rolls-Royce plc, London (GB)

( * ) Notice: Subject to any disclaimer, the term of this patent is extended or adjusted under 35 U.S.C. 154(b) by 359 days.

(21) Appl. No.: 10/628,440

(22) Filed: Jul. 29, 2003

(65) Prior Publication Data
US 2006/0081419 A1    Apr. 20, 2006

(30) Foreign Application Priority Data
Aug. 14, 2002  (GB) ................................. 0218849.8

(51) Int. Cl.
*F01M 1/00*    (2006.01)
(52) U.S. Cl. .................. 184/6.11; 184/7.4; 60/776
(58) Field of Classification Search ................ 184/6.1, 184/6.4, 6.11, 6.16, 7.4; 60/776
See application file for complete search history.

(56) References Cited

U.S. PATENT DOCUMENTS

| | | | |
|---|---|---|---|
| 4,331,112 A | | 5/1982 | Pluequet |
| 4,693,075 A | * | 9/1987 | Sabatiuk ................. 60/39.39 |
| 5,180,034 A | | 1/1993 | Lopes |
| 5,285,871 A | | 2/1994 | Sievenpiper |
| 5,477,941 A | | 12/1995 | Kumar et al. |
| 5,769,610 A | * | 6/1998 | Paul et al. ................ 417/228 |
| 5,960,625 A | * | 10/1999 | Zdvorak, Sr. ............ 60/39.34 |
| 6,584,759 B1 | * | 7/2003 | Heap ........................ 60/39.44 |
| 6,955,052 B1 | * | 10/2005 | Primlani ..................... 60/776 |
| 2004/0154306 A1 | * | 8/2004 | Benians ...................... 60/776 |

FOREIGN PATENT DOCUMENTS

| | | |
|---|---|---|
| DE | 1 000 1055 AB | 7/2001 |
| EP | 0 715 118 AB | 6/1996 |
| GB | 2 042 649 A | 9/1980 |
| GB | 2 073 830 A | 10/1981 |
| JP | 58051229 | 3/1983 |
| WO | WO PCT/US80/00848 A | 3/1981 |

* cited by examiner

*Primary Examiner*—David M. Fenstermacher
(74) *Attorney, Agent, or Firm*—W. Warren Taltavull; Manelli Denison & Selter PLLC

(57) ABSTRACT

A lubrication system comprises a reservoir for lubricant, lubricant delivery means to deliver lubricant to at least one component to be lubricated, an injector associated with each component, a control system to control the opening and closing of each injector and scavenge means to remove surplus lubricant from around each component and return it to the reservoir. Each injector comprises a pulsative injector, controlled by the control system to deliver lubricant to its associated component in a series of discrete pulses. In a preferred embodiment both the delivery of oil to each component and the scavenging of oil from each component are controlled in response to sensed conditions of that component.

20 Claims, 6 Drawing Sheets

PRIOR ART

LUBRICATION SYSTEM

FIELD OF INVENTION

This invention relates to lubrication systems. More particularly, but not exclusively, this invention relates to a method and apparatus for controlling the flow of lubricating oil in a gas turbine engine.

BACKGROUND OF THE INVENTION

Conventionally, gas turbine engine oil systems have a continuous oil flow which feeds to bearings, gears and splines. Also, components of a gas turbine engine that are manufactured from non-corrosion resistant materials are provided with oil to prevent corrosion. Most gas turbine engines use a self-contained recirculatory lubrication system in which the oil is distributed around the engine and returned to an oil tank by pumps. However, some engines use what is known as a total loss or expendable system in which the oil, after lubricating the engine, is either burnt in the engine's normal combustion process or is allowed to spill overboard.

In known arrangements, oil is supplied to desired locations on the basis of that needed during take-off conditions where the performance of the engine is at its maximum. However, a gas turbine engine operates for a large proportion of its cycle at cruise conditions, which requires less performance and hence a lower supply of oil to its components than at take-off.

It is known to have a lubrication system of this type where the maximum oil flow is not supplied to the engine components all the time. In JP 58051229, for example, a system is described in which a solenoid valve permits a proportion of the oil flow from the pump to be recirculated to the pump inlet, when the engine is running at low-power. Recirculating systems such as this have the disadvantage that the pump is operating at full power all the time, which increases power consumption, noise and oil heating.

U.S. Pat. No. 4,245,465 discloses a three-stage poppet valve to modulate the oil flow in response to engine speed. U.S. Pat. No. 5,180,034 discloses a system with a variable-speed oil pump, controlled in response to engine speed, throttle setting and other parameters, to vary the oil flow to the engine components.

Systems that modulate the flow of oil in this way have the disadvantage that, where oil is directed to a specific region within a component (for example, within a bearing chamber) by means of a targetted jet or nozzle, the jet of oil will only be aimed correctly for one flow condition, and when the flow is modulated by the control system to a different condition, the aim of the oil jet will be upset and the component will not be supplied with oil in the optimum manner.

SUMMARY OF THE INVENTION

According to one aspect of the present invention, a lubrication system comprises a reservoir for lubricant, lubricant delivery means to deliver lubricant to at least one component to be lubricated, an injector associated with each component, a control system to control the opening and closing of each injector and scavenge means to remove surplus lubricant from around each component and return it to the reservoir, in which each injector comprises a pulsative injector, controlled by the control system to deliver lubricant to its associated component in a series of discrete pulses.

At least one injector may be a multiple step injector. At least one injector may be a variable aperture injector. At least one injector may have a minimum flow bypass.

In a preferred embodiment of this aspect of the invention, the control system controls the supply of lubricant to at least one component in response to the operating conditions of that component.

The lubricant delivery means may comprise a pump.

The lubricant delivery means may comprise at least one accumulator to smooth the fluctuations in pressure arising out of the pulsative delivery of lubricant.

The scavenge means may comprise a variable speed scavenge pump maintaining a substantially constant pressure head and a restrictor associated with each component.

At least one restrictor may be a variable restrictor controlled by the control system in response to the operating conditions of its associated component.

The scavenge means may comprise a scavenge pump associated with each component, each scavenge pump being controlled by the control system in response to the operating conditions of its associated component.

At least one scavenge pump may be a constant volume pump. At least one scavenge pump may be a constant speed, variable volume pump.

The lubrication system may be a lubrication system for a gas turbine engine.

According to one embodiment of an alternative aspect of the invention, a method for lubricating a component of a gas turbine engine comprises the steps of storing lubricant in a reservoir, delivering the lubricant to a pulsative injector associated with the component, controlling the pulsative injector to deliver lubricant to the component in a series of discrete pulses and scavenging surplus lubricant from the component and returning it to the reservoir.

According to an alternative embodiment of this aspect of the invention, a method for lubricating a component of a gas turbine engine comprises the steps of storing lubricant in a reservoir, delivering the lubricant to a pulsative injector associated with the component, sensing at least one first condition of the component, controlling the pulsative injector, in response to at least one first condition of the component, to deliver lubricant to the component in a series of discrete pulses and scavenging surplus lubricant from the component and returning it to the reservoir.

Preferably the scavenging of surplus lubricant comprises the steps of sensing at least one second condition of the component and controlling a scavenge pump associated with the component, in response to at least one second condition of the component, to scavenge surplus lubricant from the component and return it to the reservoir. The second condition may be one or more selected from the group comprising a pressure, a temperature, a heat flux, an engine speed.

According to a further alternative embodiment of this aspect of the invention, a method of lubricating a component of a gas turbine engine comprises lubricating the component by a lubricating system according to any of the seventh to sixteenth paragraphs above.

BRIEF DESCRIPTION OF THE DRAWINGS

The invention will now be more particularly described, by way of example, with reference to the accompanying drawings in which.

DETAILED DESCRIPTION OF THE INVENTION

Figure 1:
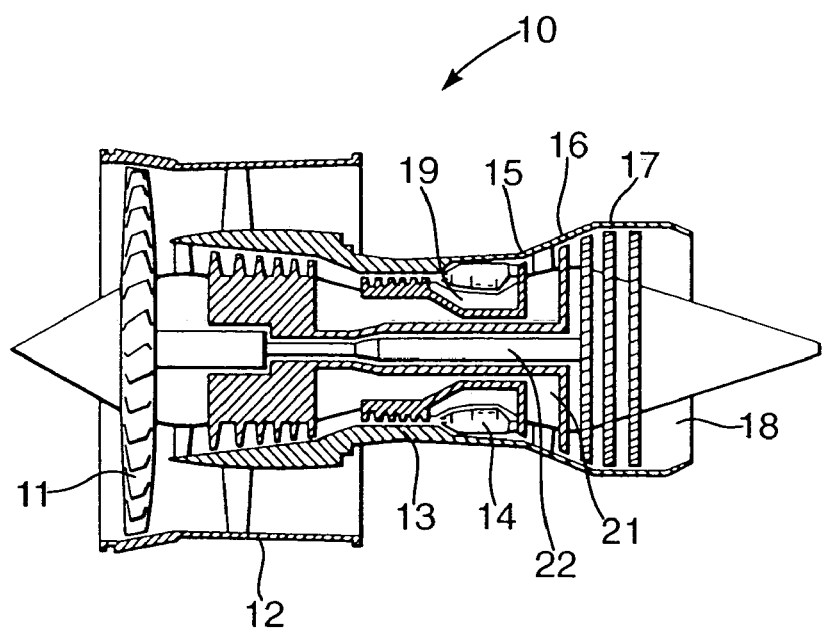
FIG. 1 is a cross section through a gas turbine engine of known type.

Referring first to FIG. 1, a gas turbine engine shown generally at 10 is of conventional configuration. It comprises in axial flow series a fan 11, intermediate pressure compressor 12, high pressure compressor 13, combustor 14, high, intermediate and low pressure turbines 15, 16 and 17 respectively and an exhaust nozzle 18.

Air is accelerated by the fan 11 to produce two flows of air, the outer of which is exhausted from the engine 10 to provide propulsive thrust. The inner flow of air is directed into the intermediate pressure compressor 12 where it is compressed and then directed into the high pressure compressor 13 where further compression takes place.

The compressed air is then mixed with fuel in the combustor 14 and the mixture combusted. The resultant combustion products then expand through the high, intermediate and low pressure turbines 15, 16, 17 respectively before being exhausted to atmosphere through the exhaust nozzle 18 to provide additional propulsive thrust. The high, intermediate and low pressure turbines 15, 16, 17 drive, respectively, the high and intermediate pressure compressors 13, 12 and the fan 11 via concentric driveshafts 19, 21, 22.

Figure 2:
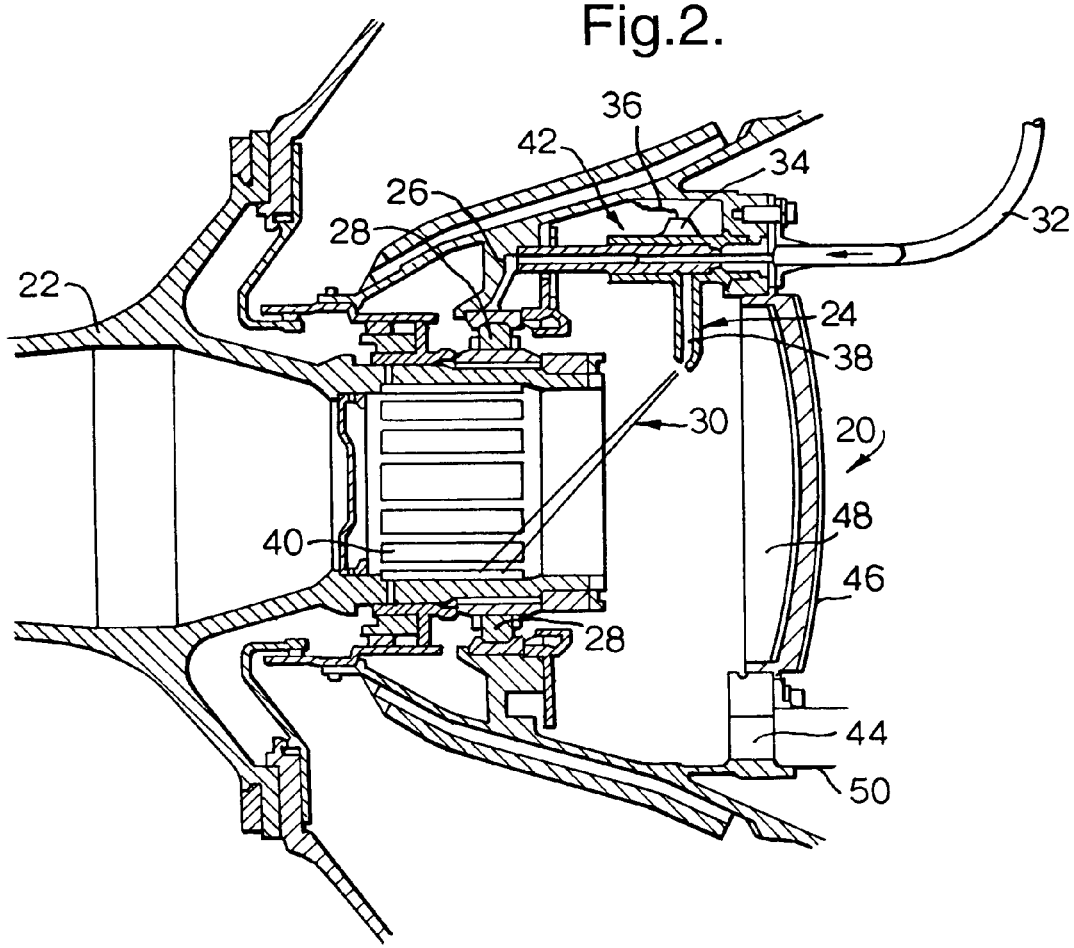
FIG. 2 is a cross sectional view through part of a gas turbine engine showing part of a lubrication system according to the present invention.

FIG. 2 shows a bearing chamber 20 located at the rear end of a shaft 22 on which the low pressure turbine (17 in FIG. 1) is mounted by means of a bearing 28. Two oil injectors 24, 26 provide oil to the bearing 28. The oil injector 24 provides a targetted jet of oil 30 to the inner surfaces of the bearing 28 whilst the oil injector 26 provides a film of oil to the outer surfaces of the bearing. The oil 30 from injector 24 is distributed around the bearing by oil scallops 40. Oil strainers or filters 42, 44 are provided to remove unwanted debris from the oil supply and a bearing compartment end cap 46 seals the rear of the bearing compartment 48. Oil exits the bearing compartment 48 through an oil scavenge pipe 50 fitted with a filter or strainer 44.

Oil is supplied to the injectors 24 and 26 through a common oil feed pipe 32. The supply of oil 30 is controlled by a control system (not shown) such that the amount of oil supplied is directly linked to the operating conditions of the engine, and in this embodiment to the requirements of the bearing and its surroundings.

Figure 3:
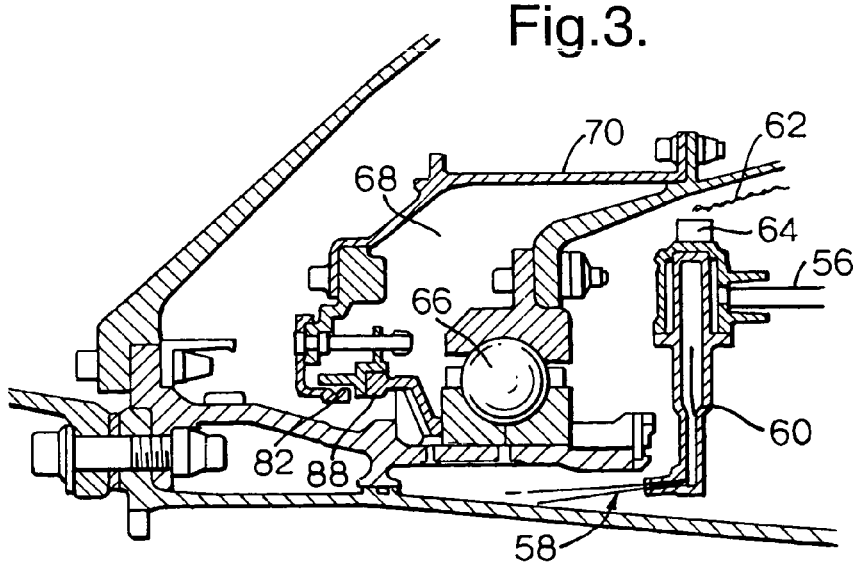
FIG. 3 is a cross sectional view through part of a gas turbine engine showing part of an alternative embodiment of a lubrication system according to the present invention.

Now referring to FIG. 3, an oil injector 54 is located in the bearing compartment 68 of the front bearing 66 of the low pressure turbine shaft 22. In this embodiment only one oil injector 54 is shown and this is fed with oil through a feed pipe 56. The bearing 66 is located in the front bearing compartment 68 and is enclosed by a casing structure 70. Rotating seals 82 and 88 prevent oil from escaping from the bearing chamber 68.

Figure 4:
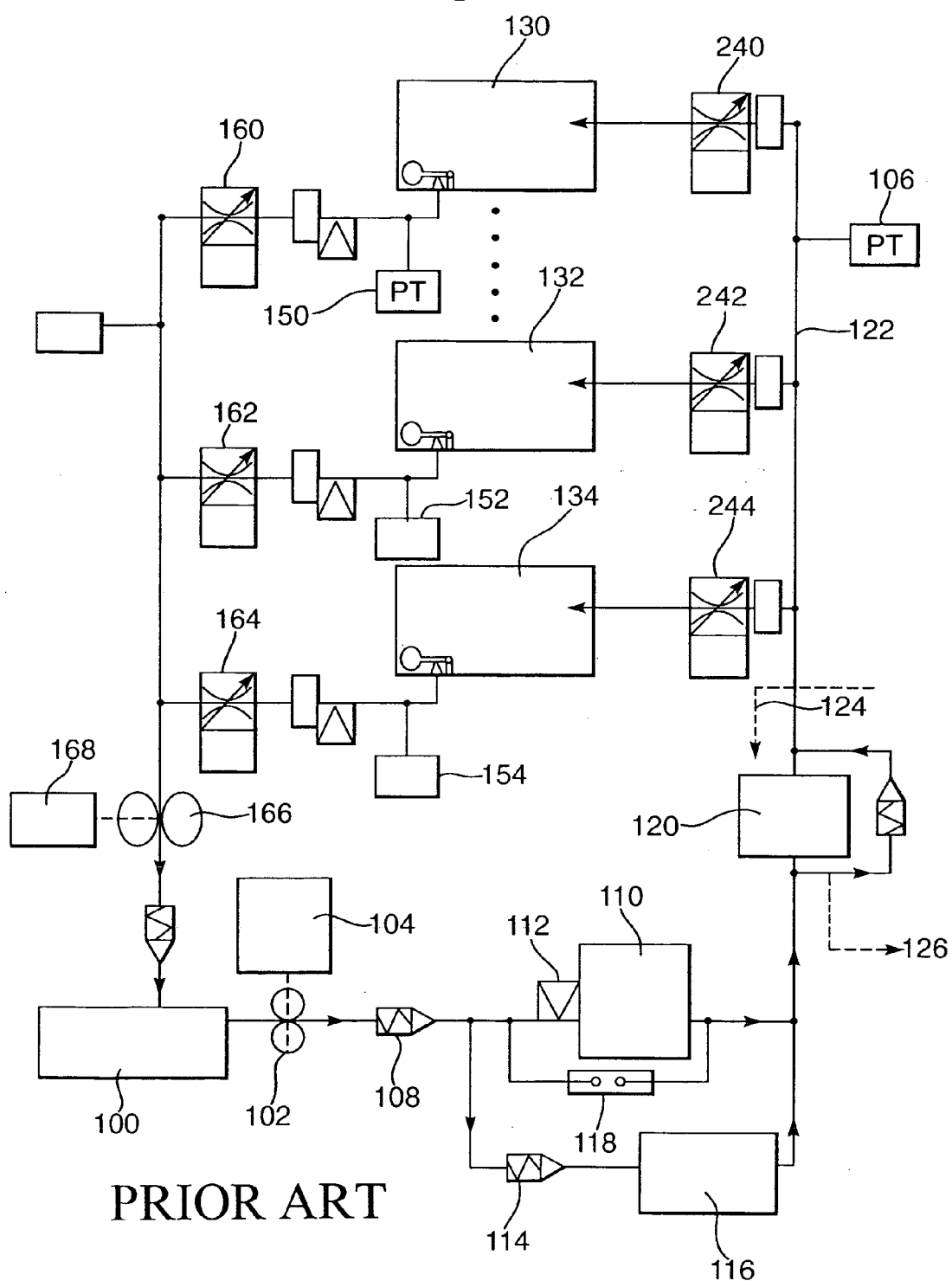
FIG. 4 is a schematic illustration of a lubrication system of known type.

An example of a lubrication system flow layout of known type is shown in FIG. 4. Oil is pumped from a tank 100 by a pump 102, driven by a motor 104. The motor is controlled by a control system (not shown) to maintain a constant pressure on the supply side of the lubrication system, as measured by pressure and temperature sensor 106. It is envisaged that different supply pressures might be required for different operating conditions, and the control system would accommodate this. The pumped oil passes through an anti-syphon valve 108 and a filter 110. A magnetic chip detector 112 is located adjacent the filter 110 to trap ferrous debris. If the filter 110 becomes blocked, a spring-loaded bypass valve 114 opens so the oil can flow through a backup filter 116. A pressure drop sensor 118 across the filter 110 generates a warning signal to indicate to an operator that the filter 110 is blocked.

A heat exchanger 120, in the form of a fuel-cooled oil cooler, is located in the main oil delivery line 122. This removes heat from the oil and uses it to increase the fuel temperature. The fuel inlet and outlet are shown by dashed lines 124 and 126. Other types of heat exchanger could equally well be used in place of the fuel-cooled oil cooler, for example an air-oil heat exchanger.

The oil supply line 122 delivers oil to three components 130, 132, 134. It will be appreciated that other lubrication systems may have fewer or more components. Associated with each of the components 130, 132, 134 is a variable flow restrictor, respectively 240, 242, 244, which controls the delivery of oil to each component 130, 132, 134. A control system (not shown) varies the opening of each restrictor 240, 242, 244, thereby changing the pressure drop across it and controlling the flow rate of oil to each component 130, 132, 134 according to demand.

Surplus oil is removed from each component 130, 132, 134 through an associated variable restrictor 160, 162, 164. A pump 166, powered by a motor 168, is of similar type to that on the supply side, and maintains a substantially constant sink pressure to extract oil (and air) from each component 130, 132, 134. The system will be scavenging varying proportions of oil and air from the three components 130, 132, 134 depending on the quantity of oil being supplied to each by the restrictors 240, 242, 244. The respective sensors 150, 152, 154 sense the pressure at the scavenge side of each component 130, 132, 134 (which will vary according to the proportions of oil and air in the fluid scavenged from each component) and the size of the aperture in each variable restrictor 160, 162, 164 is then adjusted accordingly to maintain effective scavenging. The oil scavenged by the pump 166 is returned to the tank 100.

A disadvantage of the lubrication system of FIG. 4 is that as the aperture of the variable restrictor 240, 242, 244 changes the pressure drop across it also changes. This will upset the aim of the oil jet or spray so that the oil is directed at a different part of the component 130, 132, 134. This means that optimum lubrication of each component 130, 132, 134 can only be achieved for one condition of its associated variable restrictor 240, 242, 244.

A further disadvantage of the lubrication system of FIG. 4 is that the operation of a restrictor-based control system will be very complex. Restrictors relying on controlling pressure drop to vary volumetric or mass flow rate will be subject to non-linearities introduced by, for example, variations in temperature (and hence viscosity) of the oil. Open loop control of such a system would require a very high fidelity model to predict the flow rates, which would have to take account of the upstream and downstream pressures and the temperature.

Figure 5:
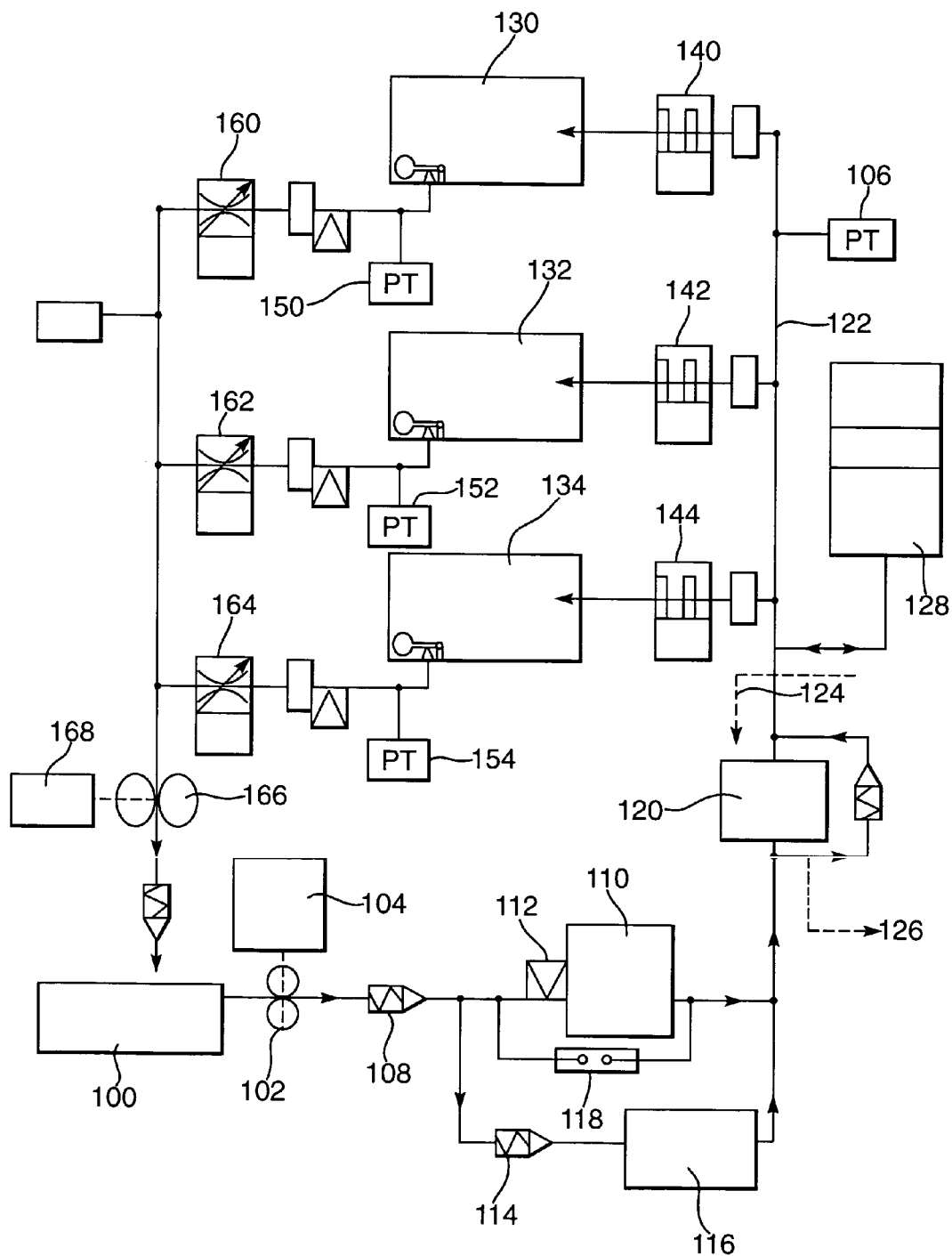
FIG. 5 is a schematic illustration of one embodiment of a lubrication system according to the invention.
Figure 6A:
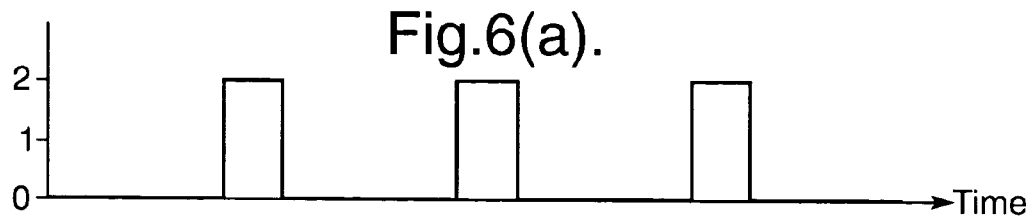
FIG. 6 illustrates schematically a number of possible schedules for the opening and closing of an injector in a lubrication system according to the invention.
Figure 6B:
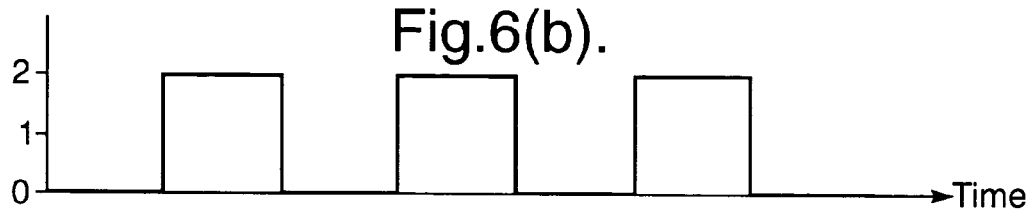
Figure 6C:
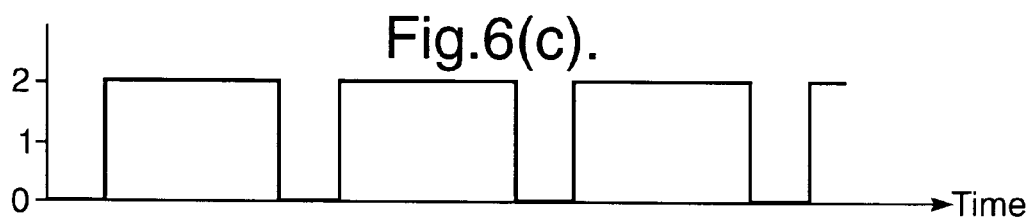
Figure 6D:
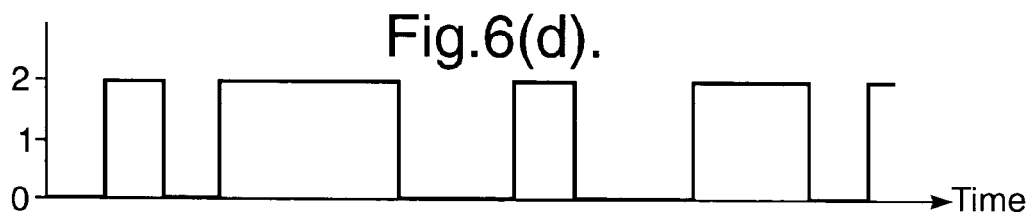
Figure 6E:
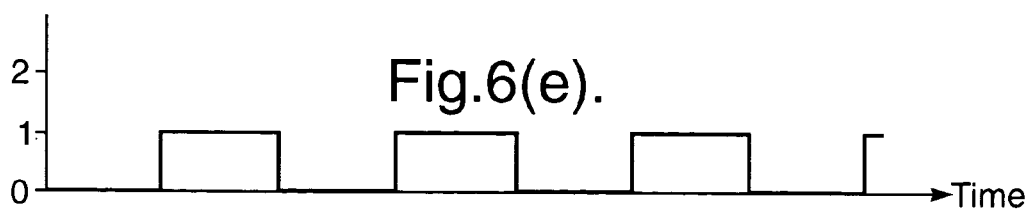
Figure 6F:
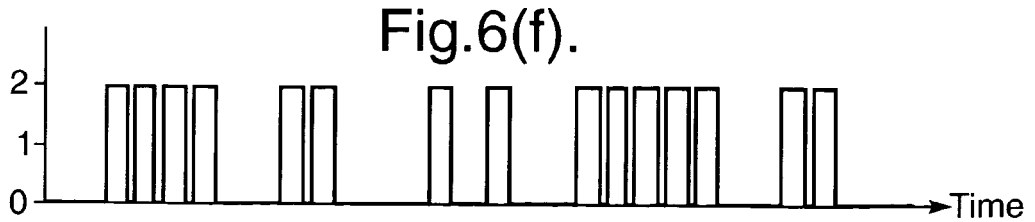

FIG. 5 shows an embodiment of a lubrication system according to the invention, which seeks to overcome this disadvantage.

Many components shown in FIG. 5 are identical to components in FIG. 4, and are identified by the same reference numbers. In particular, the scavenge side of the system operates identically to that described in the embodiment of FIG. 4.

On the delivery side of the lubrication system oil is pumped from a tank 100 by a pump 102, driven by a motor 104. The motor is controlled by a control system (not shown) to maintain a constant pressure on the supply side of the lubrication system, as measured by pressure and temperature sensor 106. It is envisaged that different supply pressures might be required for different operating conditions, and the control system would accommodate this. The pumped oil passes through an anti-syphon valve 108 and a filter 110. A magnetic chip detector 112 is located adjacent the filter 110 to trap ferrous debris. If the filter 110 becomes blocked, a spring-loaded bypass valve 114 opens so the oil can flow through a backup filter 116. A pressure drop sensor 118 across the filter 110 generates a warning signal to indicate to an operator that the filter is blocked.

A heat exchanger 120, in the form of a fuel-cooled oil cooler, is located in the main oil delivery line 122. This removes heat from the oil and uses it to increase the fuel temperature. The fuel inlet and outlet are shown by dashed lines 124 and 126. Other types of heat exchanger could equally well be used in place of the fuel-cooled oil cooler, for example an air-oil heat exchanger. An accumulator 128 is connected to the oil delivery line 122 to smooth out any fluctuations in the oil supply.

The oil supply line 122 delivers oil to three components 130, 132, 134. It will be appreciated that other systems may have fewer or more components. Associated with each component 130, 132, 134 is an injector, respectively 140, 142, 144, which delivers oil in a jet or spray to the required part of its respective component 130, 132, 134.

The injectors 140, 142, 144 are variable aperture pulsative injectors of the type described in German patent application DE 100 01 055 A1. This type of injector can be switched by a control system (not shown) between an open state in which it will permit fluid flow and a closed state in which it will prevent fluid flow. The size of the aperture in the open state can be separately controlled.

A control system (not shown) controls the size of the aperture of each injector 140, 142, 144 and the frequency of its opening and closing so that oil is delivered to the components 130, 132, 134 in a series of discrete, time-based pulses. Pressure and temperature sensors 150, 152, 154 associated with each component 130, 132, 134 relay to the control system the temperature of the oil leaving the component 130, 132, 134 and the control system responds to maintain the required oil flow to each component 130, 132, 134.

FIG. 6 shows schematically a number of possible flow modulations for one of the injectors 140, 142, 144, illustrating some of the possible variations in quantity and pattern of oil delivery. In each graph, the x-axis represents time and the y-axis represents the level of fluid flow.

(a), (b) and (c) show arrangements in which the injector is in its open state for, respectively, one-quarter, one-half and three-quarters of the time and it will be apparent that the quantity of oil delivered to the injector's associated component in a given time period will be proportional to the area under the graph. The arrangements of (a), (b) and (c) could also be combined, over time, in any desired way, as shown in (d). This type of flow modulation is commonly called "pulse width modulation".

(e) illustrates how the variable aperture of the injector may be exploited. It will be apparent that this arrangement passes the same quantity of oil in a given time period as does (a), but by pulses of twice the duration, each delivering oil at half the flow rate.

Lastly, (f) illustrates the type of flow modulation commonly called "variable mark/space". Relatively small, equally sized pulses of oil are delivered more frequently when more oil is required and less frequently when less oil is required.

The flow modulations illustrated in FIG. 6 are not intended to be exhaustive. It will be recognised, by one skilled in the art, that the techniques of flow modulation described here may be varied and combined in any desired way, and may be supplemented or replaced by other similar techniques not described here but which will be familiar to those skilled in the art.

The type of injector 140, 142, 144 described above has a variable aperture. Other types of injector are known, and could be used in place of the variable aperture injector if it was more suitable for a particular component 130, 132, 134. One such type of injector, commonly called a "multiple step" injector, has an aperture whose size can be adjusted in a number of discrete steps (typically three). Yet another type of injector has no adjustment for the aperture size, and operates purely as a pulsative injector.

A further feature, which may be incorporated into any of the types of injector 140, 142, 144 described above, allows a "bypass flow" of oil at all times, whether or not the main aperture of the injector 140, 142, 144 is open. In this way a certain minimum flow of oil is maintained to the component 130, 132, 134 at all times, supplemented as required by the controlled, pulsed flow.

A problem arises with the embodiment shown in FIG. 5 if, for some reason, only air is being scavenged from one of the components 130, 132, 134. If the restrictor does not close sufficiently or quickly enough, the resulting high volumetric flow rate into the pump 166 will effectively prevent any scavenging from the other components 130, 132, 134.

Figure 7:
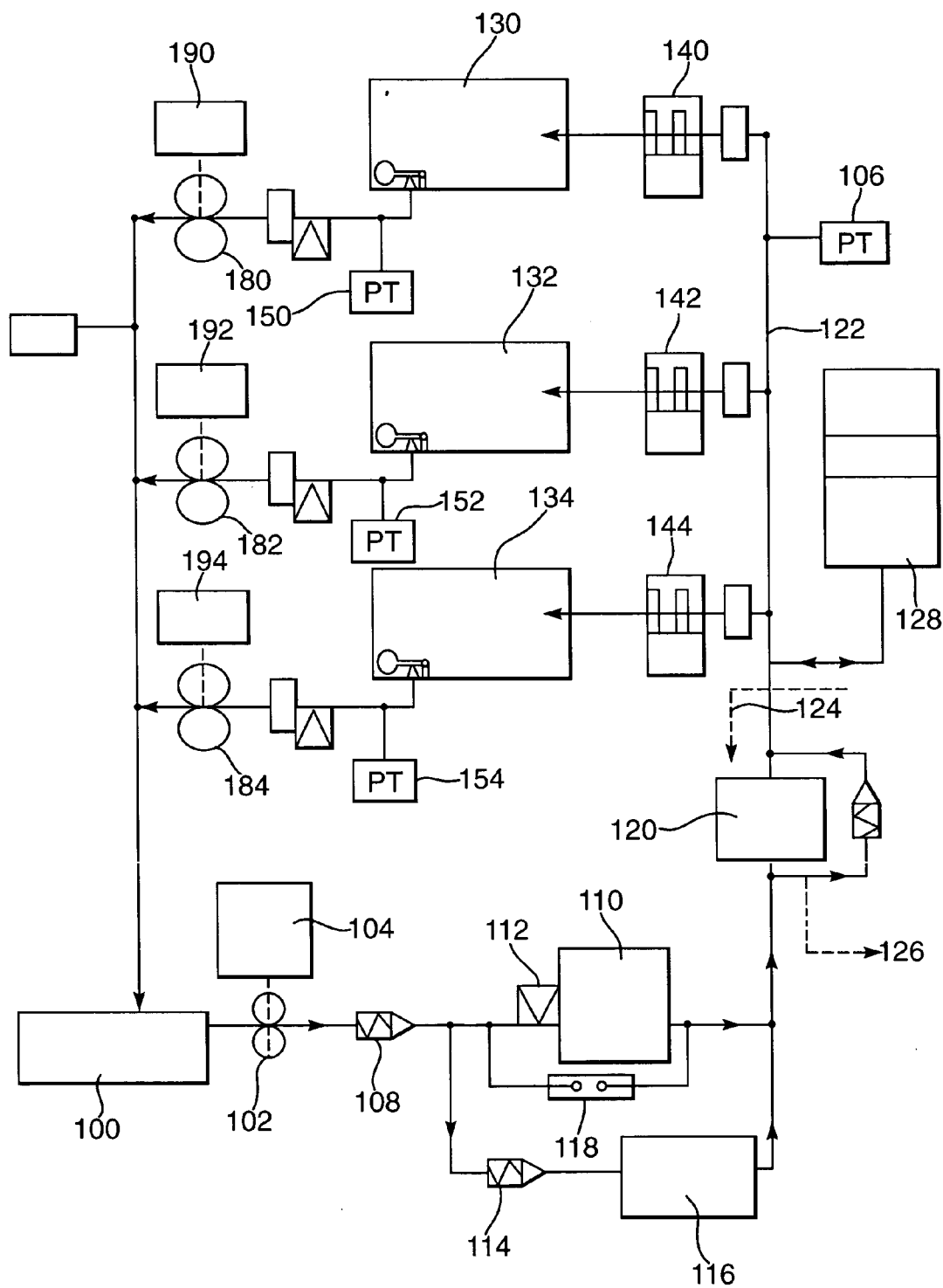
FIG. 7 is a schematic illustration of an alternative embodiment of a lubrication system according to the invention.

FIG. 7 shows an alternative embodiment of a lubrication system according to the invention, which seeks to overcome this disadvantage.

Many components shown in FIG. 7 are identical to components in FIG. 5, and are identified by the same reference numbers. In particular, the delivery side of the system operates identically to that described in the embodiment of FIG. 5.

In the embodiment of FIG. 7, oil is scavenged from each component 130, 132, 134 by an associated scavenge pump 180, 182, 184 of the constant-volume type. Each scavenge pump 180, 182, 184 is driven by an associated motor 190, 192, 194. The speed of each motor 190, 192, 194 is controlled in response to the scavenge requirements of its associated component 130, 132, 134 (as measured by sensors 150, 152, 154). The scavenged oil is returned to the tank 100. The scavenging from each component 130, 132, 134 is therefore matched closely to that component's requirements.

The scavenge pumps 180, 182, 184 may alternatively be of the constant speed, variable volume type.

We claim:

1. A lubrication system comprising
   a reservoir for lubricant;
   lubricant delivery means to deliver lubricant to at least one component to be lubricated;

an injector associated with each component;
a control system to control the opening and closing of each injector;
scavenge means to remove surplus lubricant from around each component and return it to the reservoir;
in which each injector comprises a pulsative injector, controlled by the control system to deliver lubricant to its associated component in a series of discrete pulses.

2. A lubrication system as claimed in claim 1, in which at least one injector is a multiple step injector.

3. A lubrication system as claimed in claim 1, in which at least one injector is a variable aperture injector.

4. A lubrication system as claimed in claim 1, in which at least one injector has a minimum flow bypass.

5. A lubrication system as claimed in claim 1, the lubrication system further comprising sensing means arranged and configured to sense at least one first condition of at least one component, in which the control system controls the supply of lubricant to at least one component in response to at least one first condition of that component.

6. A lubrication system as claimed in claim 1, in which the lubricant delivery means comprises a pump.

7. A lubrication system as claimed in claim 6, in which the lubricant delivery means comprises at least one accumulator to smooth the fluctuations in pressure arising out of the pulsative delivery of lubricant.

8. A lubrication system as claimed in claim 1, in which the scavenge means comprises a variable speed scavenge pump maintaining a substantially constant pressure head and a restrictor associated with each component.

9. A lubrication system as claimed in claim 8, the lubrication system further comprising sensing means arranged and configured to sense at least one second condition of at least one component, in which at least one restrictor is a variable restrictor controlled by the control system in response to at least one second condition of its associated component.

10. A lubrication system as claimed in claim 1, the lubrication system further comprising sensing means arranged and configured to sense at least one second condition of at least one component, in which the scavenge means comprises a pump associated with at least one component, at least one pump being controlled by the control system in response to at least one second condition of its associated component.

11. A lubrication system as claimed in claim 10, in which at least one pump is a constant volume pump.

12. A lubrication system as claimed in claim 10, in which at least one pump is a constant speed, variable volume pump.

13. A gas turbine engine including a lubrication system as claimed in claim 1.

14. A method for lubricating a component of a gas turbine engine, comprising the steps of
storing lubricant in a reservoir;
delivering the lubricant to a pulsative injector associated with the component;
controlling the pulsative injector to deliver lubricant to the component in a series of discrete pulses;
scavenging surplus lubricant from the component and returning it to the reservoir.

15. A method for lubricating a component of a gas turbine engine, comprising the steps of
storing lubricant in a reservoir;
delivering the lubricant to a pulsative injector associated with the component;
sensing at least one first condition of the component;
controlling the pulsative injector, in response to at least one first condition of the component, to deliver lubricant to the component in a series of discrete pulses;
scavenging surplus lubricant from the component and returning it to the reservoir.

16. A method according to claim 14 in which the scavenging of surplus lubricant comprises the steps of
sensing at least one second condition of the component;
controlling a scavenge pump associated with the component, in response to at least one second condition of the component, to scavenge surplus lubricant from the component and return it to the reservoir.

17. A method according to claim 15 in which the scavenging of surplus lubricant comprises the steps of
sensing at least one second condition of the component;
controlling a scavenge pump associated with the component, in response to at least one second condition of the component, to scavenge surplus lubricant from the component and return it to the reservoir.

18. A method according to claim 16 in which the second condition is one or more selected from the group comprising a pressure, a temperature, a heat flux, an engine speed.

19. A method according to claim 17 in which the second condition is one or more selected from the group comprising a pressure, a temperature, a heat flux, an engine speed.

20. A method of lubricating a component of a gas turbine engine in which the component is lubricated by a lubricating system according to claim 1.

* * * * *